US009866846B2

(12) United States Patent
Fernandes et al.

(10) Patent No.: US 9,866,846 B2
(45) Date of Patent: Jan. 9, 2018

(54) METHOD AND APPARATUS FOR VIDEO PROCESSING WITH COMPLEXITY INFORMATION

(71) Applicant: Samsung Electronics Co., Ltd., Suwon-si, Gyeonggi-do (KR)

(72) Inventors: Felix Carlos Fernandes, Plano, TX (US); Madhukar Budagavi, Plano, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 272 days.

(21) Appl. No.: 14/877,776

(22) Filed: Oct. 7, 2015

(65) Prior Publication Data

US 2016/0105680 A1     Apr. 14, 2016

Related U.S. Application Data

(60) Provisional application No. 62/063,824, filed on Oct. 14, 2014.

(51) Int. Cl.
| | |
|---|---|
| *H04N 19/44* | (2014.01) |
| *H04N 19/176* | (2014.01) |
| *H04N 19/172* | (2014.01) |
| *H04N 19/127* | (2014.01) |
| *H04N 19/157* | (2014.01) |
| *H04N 19/82* | (2014.01) |
| *H04N 19/86* | (2014.01) |

(52) U.S. Cl.
CPC ......... *H04N 19/172* (2014.11); *H04N 19/127* (2014.11); *H04N 19/157* (2014.11); *H04N 19/82* (2014.11); *H04N 19/86* (2014.11)

(58) Field of Classification Search
CPC .. H04N 19/127; H04N 19/157; H04N 19/172; H04N 19/82; H04N 19/86
See application file for complete search history.

(56) References Cited

U.S. PATENT DOCUMENTS

| | | | |
|---|---|---|---|
| 2007/0291858 A1* | 12/2007 | Hussain | H04N 19/44 375/240.29 |
| 2009/0112931 A1* | 4/2009 | Wang | H04N 19/46 |
| 2012/0042313 A1 | 2/2012 | Tam et al. | |

(Continued)

FOREIGN PATENT DOCUMENTS

WO    WO 2007/053118    5/2007

OTHER PUBLICATIONS

International Search Report and Written Opinion issued for PCT/KR2015/010852 dated Feb. 2, 2016, 5 pgs.

*Primary Examiner* — Md Haque

(57) ABSTRACT

A decoder for video processing includes a receiver configured to receive a bitstream associated with a video from a coder. The decoder also includes a processor configured to parse the bitstream to determine a percentage of at least one a number of six tap filterings or a number of alpha point deblocking instances, in a specified period. The processor is further configured to determine a voltage and frequency to be used for decoding the video proportional to the percentage of the at least one of the number of six tap filterings or the number of alpha point deblocking instances. The processor is configured to decode the video at the determined voltage and frequency. Other embodiments including a encoder and method also are disclosed.

17 Claims, 5 Drawing Sheets

(56) References Cited

U.S. PATENT DOCUMENTS

2012/0151065 A1* 6/2012 Rintaluoma ......... H04N 19/127
  709/226
2012/0207216 A1* 8/2012 Yu ....................... H04N 19/105
  375/240.12
2012/0314771 A1* 12/2012 Lim ..................... H04N 19/117
  375/240.16

* cited by examiner

METHOD AND APPARATUS FOR VIDEO PROCESSING WITH COMPLEXITY INFORMATION

CROSS-REFERENCE TO RELATED APPLICATIONS AND CLAIMS OF PRIORITY

This application claims priority under 35 U.S.C. §119(e) to U.S. Provisional Patent Application No. 62/063,824, entitled "EFFICIENT COMPLEXITY METRICS FOR VIDEO PROCESSING", filed Oct. 14, 2014, which is hereby incorporated by reference into this patent document in its entirety.

TECHNICAL FIELD

The present application relates generally to video processing devices and, more specifically, to methods for dynamic voltage and frequency scaling for video processing in order to reduce power usage.

BACKGROUND

Power consumption is an increasingly critical issue for video-capable mobile devices, where video processing requires a significant amount of energy for video encoding, decoding and associated memory transfers. Video codecs in mobile devices can be implemented using either software on the CPU, such as an ARM (Advanced RISC Machines) platform, or hardware via dedicated ASIC (application specific integrated circuit) design. Recent advances in circuits design have demonstrated that power consumption can be reduced if circuits are placed into a low-power state, which uses a slower clock rate and a lower supply voltage.

SUMMARY

This disclosure provides methods and apparatuses for implementing complexity-based video processing and corresponding power reduction in a display screen.

In a first example, a decoder for video processing is provided. The decoder includes a receiver configured to receive, from an encoder, a bitstream associated with a video. The decoder also includes a processor configured to parse the bitstream to determine a percentage of at least one of a number of six tap filterings or a number of alpha point deblocking instances, in a specified period, determine a voltage and frequency to be used for decoding the video as a function of the percentage of the at least one of the number of six tap filterings or the number of alpha point deblocking instances, in the specified period; and decode the video at the determined voltage and frequency.

In a second example, an encoder for video processing is provided. The encoder includes a transmitter configured to transmit, to a decoder, a bitstream associated with a video. The encoder also includes a processor configured to code a video to have at least one variable of a number of six tap filterings or a number of alpha point deblocking instances, in a specified period. The processor is also configured to determine a percentage of the at least one of the number of six tap filterings or the number of alpha point deblocking instances, in the specified period. The processor is further configured to generate the bitstream containing the percentage of the at least one of the number of six tap filterings or the number of alpha point deblocking instances, in the specified period.

In a third example, a method for video processing is provided. The method includes parsing, at a decoder, a bitstream associated with a video to determine a percentage of at least one of a number of six tap filterings or a number of alpha point deblocking instances, in a specified period. The method also includes determining, at the decoder, a voltage and frequency to be used for decoding the video according to the percentage of the at least one of the number of six tap filterings or the number of alpha point deblocking instances, in the specified period. The method further includes decoding, at the decoder, the video at the determined voltage and frequency.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication unless explicitly specified. The terms "include" and "comprise," as well as derivatives thereof, mean inclusion without limitation. The term "or" is inclusive, meaning "and/or." The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical signals or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior uses as well as future uses of such defined words and phrases.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1A through 4, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wired or wireless communication system, such as with a battery-powered smartphone, laptop, or other device having a wired or wireless network connection.

The following documents and standards descriptions are hereby incorporated into the present disclosure as if fully set forth herein: (1) ISO/I 23001-11 International Standard, "MPEG Green Metadata"; (2) ISO/WC 14496-2 International Standard, "MPEG-4 Simple Profile"; (3) ITU-T H.264 or ISO/IEC 14496-10 International Standard, MPEG-4 AVC; and (4) U.S. patent application Ser. No. 14/091,238, "DYNAMIC VOLTAGE/FREQUENCY SCALING FOR VIDEO PROCESSING USING EMBEDDED COMPLEXITY METRICS," filed on Nov. 26, 2013.

In embodiments of this disclosure, metadata used for display adaptation is embedded within a video stream or other video content information using a Supplemental Enhancement Information (SEI) message, which is parsed at a decoder to help with display power reduction. In other embodiments, the metadata can be delivered out-of-band using a transport mechanism, storage medium, or the like. Elements in an extended SEI message can be derived at the encoder during video encoding.

Figure 1A:
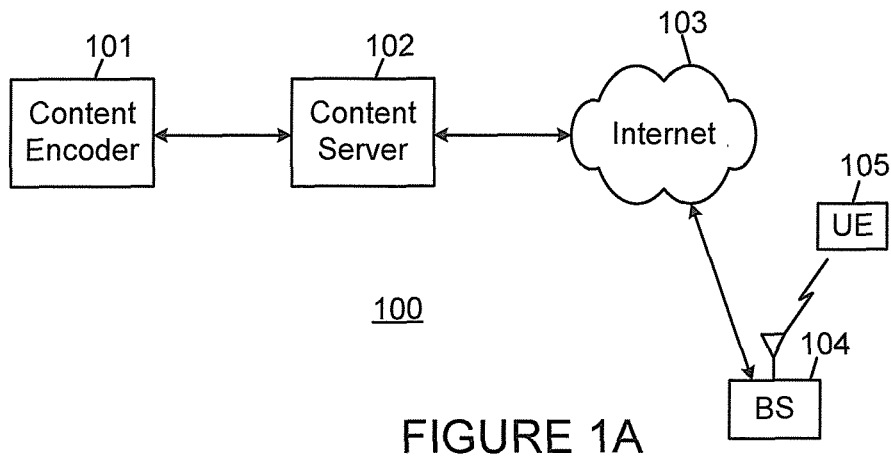
FIG. 1A is a high level diagram illustrating an example network within which devices may implement complexity-based video processing according to this disclosure.

FIG. 1A is a high-level diagram illustrating an example network 100 within which devices may implement complexity-based video processing according to this disclosure. As shown in FIG. 1, the network 100 includes a content encoder 101, which can include a data processing system having an encoder controller configured to encode video content. The content encoder 101 can be communicably coupled to (or alternatively integrated with) a content server 102, which can include a data processing system configured to deliver video content to user devices. The content server 102 can be coupled by a communications network, such as the Internet 103 and a wireless communication system including a base station (BS) 104, for delivery of the video content to a user device 105. The user device 105 can also be referred to as a user equipment (UE) or a mobile station (MS). As noted above, the user device 105 can be a "smart" phone, tablet, or other device capable of functions other than wireless voice communications, including at least playing video content. Alternatively, the user device 105 can be a laptop computer or other wired or wireless device, such as any device that is primarily battery-powered during at least periods of typical operation.

Figure 1B:
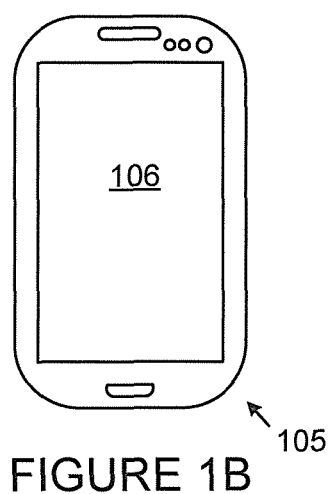
FIG. 1B is a front view of an example user device from the network of FIG. 1A within which complexity-based video processing can be implemented according to this disclosure.
Figure 1C:
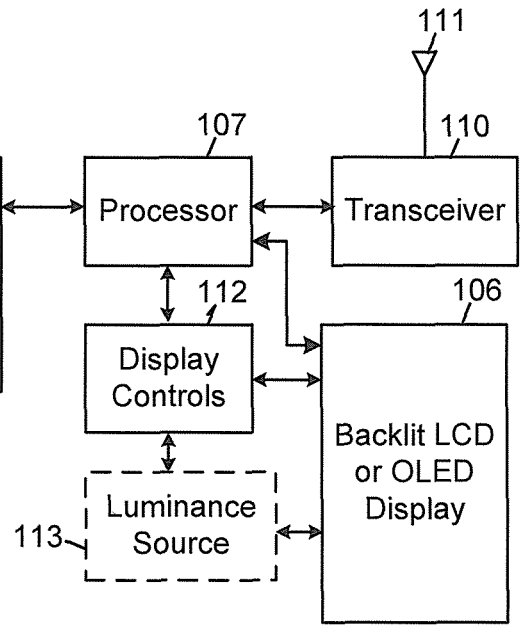
FIG. 1C is a high level block diagram of the functional components in the example user device of FIG. 1A according to this disclosure.

FIG. 1B is a front view of an example user device 105 from the network 100 of FIG. 1A within which complexity-based video processing can be implemented according to this disclosure. FIG. 1C is a high level block diagram of the functional components in the example user device 105 of FIG. 1A according to this disclosure. The user device 105 in this example represents a mobile phone or smartphone and includes a display 106. A processor 107 coupled to the display 106 can control content that is presented on the display 106. The processor 107 and other components within the user device 105 can be powered by a battery or other power source that can be recharged by an external power source or can be powered by an external power source. A memory 108 coupled to the processor 107 can store or buffer video content for playback by the processor 107 and presentation on the display 106 and can also store a video player application (or "app") 109 for performing such video playback. The video content being played can be received, either contemporaneously (such as overlapping in time) with the playback of the video content or prior to the playback, via a transceiver 110 connected to an antenna 111. As described above, the video content can be received in wireless communications from a base station 104.

Figure 2A:
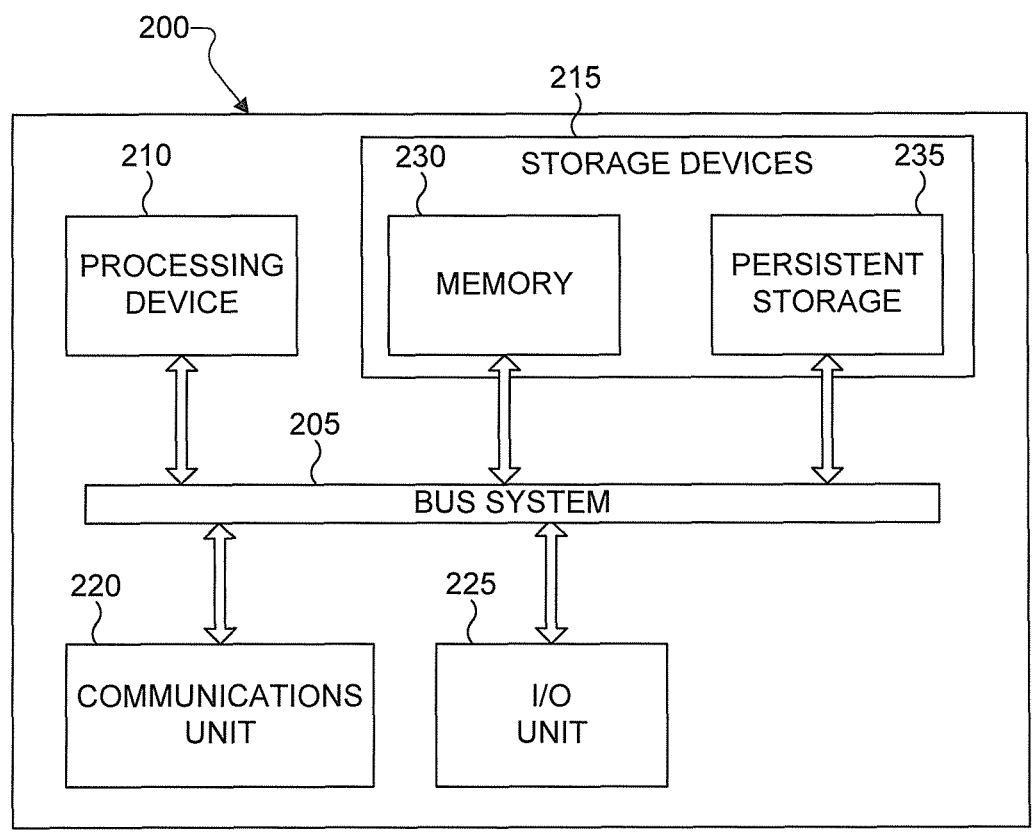
FIG. 2A is a high level block diagram of an example content server from the network of FIG. 1A within which complexity-based video processing can be implemented according to this disclosure.

FIG. 2A is a high level block diagram of an example content server 102 from the network 100 of FIG. 1A within which complexity-based video processing can be implemented according to this disclosure. As shown in FIG. 2A, the server 200 includes a bus system 205, which can be configured to support communication between at least one processing device 210, at least one storage device 215, at least one communications unit 220, and at least one input/output (I/O) unit 225.

The processing device 210 is configured to execute instructions that can be loaded into a memory 230. The server 200 can include any suitable number(s) and type(s) of processing devices 210 in any suitable arrangement. Example processing devices 210 can include microprocessors, microcontrollers, digital signal processors, field programmable gate arrays, application specific integrated circuits, and discrete circuitry. The processing device(s) 210 can be configured to execute processes and programs resident in the memory 230, such as operations for generating display adaptation metadata and complexity information.

The memory 230 and a persistent storage 235 are examples of storage devices 215, which represent any structure(s) capable of storing and facilitating retrieval of information (such as data, program code, or other suitable video information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, Flash memory, or optical disc.

The communications unit 220 is configured to support communications with other systems or devices. For example, the communications unit 220 can include a network interface card or a wireless transceiver facilitating communications over the network 103. The communications unit 220 can be configured to support communications through any suitable physical or wireless communication link(s).

The I/O unit 225 is configured to allow for input and output of data. For example, the I/O unit 225 can be configured to provide a connection for user input through a keyboard, mouse, keypad, touchscreen, or other suitable input device. The I/O unit 225 can also be configured to send output to a display, printer, or other suitable output device. In some embodiments, the I/O unit 225 can be configured to allow the input or output of complexity information embedded within SEI message(s).

Note that while FIG. 2A is described as representing the server 102 of FIG. 1A, the same or similar structure can be used in one or more different user devices. For example, a laptop or desktop computer can have the same or similar structure as that shown in FIG. 2A.

Figure 2B:
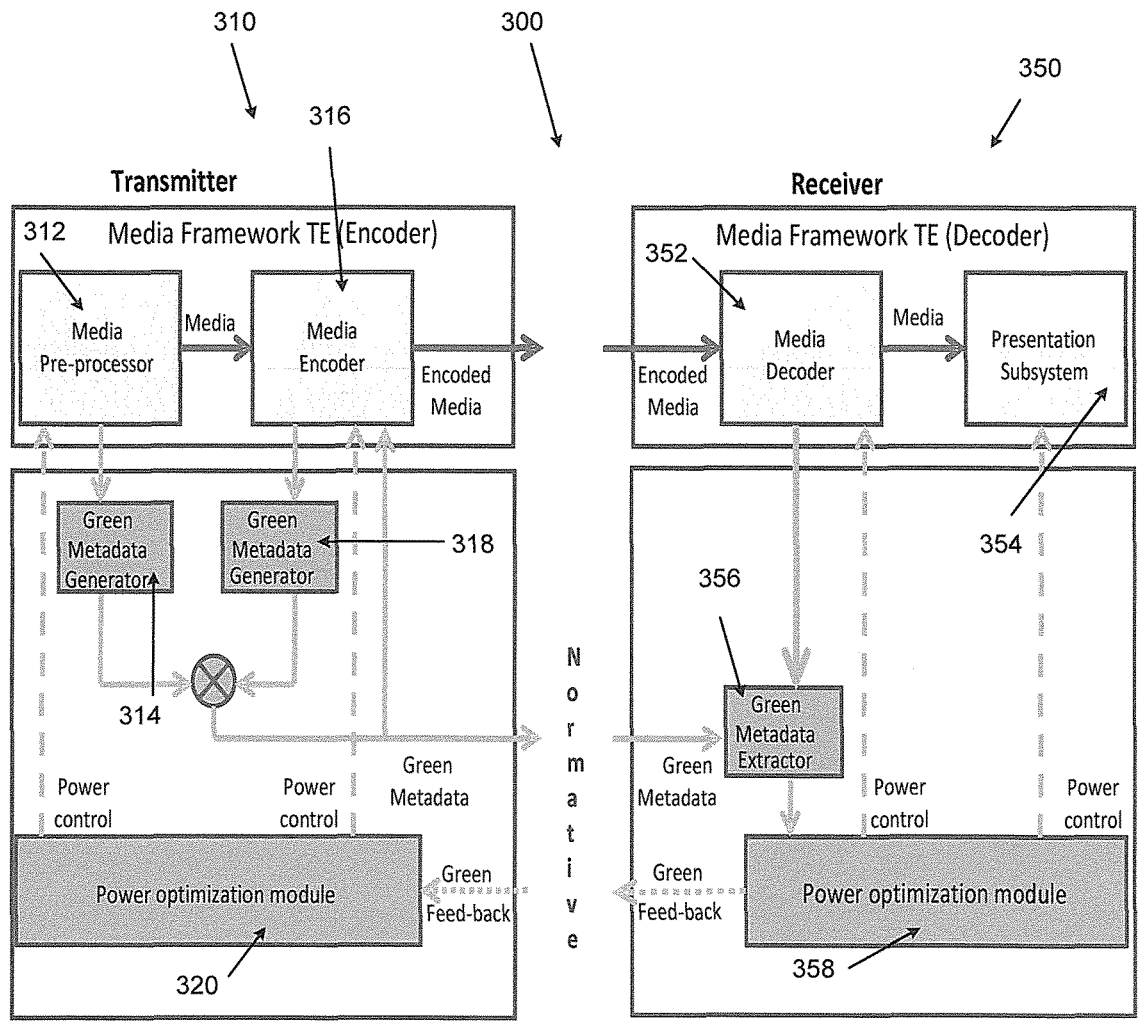
FIG. 2B is an example functional architecture to implement complexity-based video processing according to this disclosure.

FIG. 2B is an example functional architecture to implement complexity-based video processing according to this disclosure. Generally, DA provides Green Metadata having complexity metrics. As illustrated in FIG. 2B, the functional architecture 300 can includes a transmitter 310 and a receiver 350. The transmitter 310 can include a media pre-processor 312, a first green metadata generator 314, a video encoder 316, a second green metadata generator 318, and a power optimizer module 320. The receiver 350 can include a media decoder 352, a presentation subsystem 354, a green metadata extractor 356, and a power optimizer module 358.

The MPEG-4 Simple Profile Standard provides some complexity metrics in Clause 6.3.5.1. (of ISO/IEC 14496-2 International Standard, "MPEG-4 Simple Profile). Although these metrics are efficiently represented, they cannot be applied to complexity-based video processing in the widely-used AVC standard.

Power consumption is an increasingly critical issue for video-capable mobile devices, where video processing requires a significant amount of energy for video encoding, decoding and associated memory transfers. Recent advances in circuit design have demonstrated that power consumption can be reduced if circuits are placed into low-power states which use slower clock rates and lower supply voltages. To exploit these low-power states, complexity metrics that indicate decoding complexity are embedded in the bitstream and they are used to set the optimum low-power state of the decoding circuitry. This is the Codec Dynamic Voltage/Frequency Scaling (C-DVFS) decoder-power reduction technique.

Other systems fail to provide efficient complexity metrics that apply C-DVFS to widely-used decoders such as H.264/MPEG AVC. Depending on the applicability period, the prior art uses up to 32 bits for each AVC complexity metric.

Hence, there is a need for efficient complexity metrics that apply C-DVFS to widely-used decoders.

H.264/MPEG AVC is a decoding technology that is widely used in the industry. Certain embodiments provide methods to compute efficient complexity metrics for widely used decoders such as AVC. By analyzing the worst-case characteristics of the computationally intensive interpolation and deblocking modules, our methods pack each complexity metric into 8 bits, independent of the applicability period.

The MPEG Green Metadata International Standard (IS) text provides the following four complexity metrics for C-DVFS:

1. num_six_tap_filterings (32 bits)—indicates the number of 6-tap filterings in the specified period, as defined in ISO/IEC 14496-10 which is incorporated by reference into this patent document in its entirety. Each half-pel interpolation requires a 6-tap filtering operation and each quarter-pel interpolation requires either one or two 6-tap filtering operations.

2. num_alpha_point_deblocking_instances (32 bits)—indicates the number of alpha-point deblocking instances in the specified period. Using the notation in ISO/IEC 14496-10 an alpha-point deblocking instance is defined as a single filtering operation that produces either a single, filtered output p'0 or a single, filtered output q'0 where p'0 and q'0 are filtered samples across a 4×4 block edge. Therefore the number of alpha point deblocking instances is the total number of filtering operations applied to produce filtered samples of the type p'0 or q'0.

3. num_non_zero_macroblocks—indicates the number of non-zero macroblocks in the specified period.

4. num_intra_coded_macroblocks—indicates the number of intra-coded macroblocks in the specified period.

Note that there are four types of periods over which the metrics are applicable as defined by the period_type in the IS text, where the period_type specifies the type of upcoming period over which the four complexity metrics are applicable. For period_type=0, 1, 2, 3, the complexity metrics will be respectively applicable over a single picture, all pictures up to (but not including) the picture containing the next I-slice, a specified time interval (in seconds) or a specified number of pictures. When the period_type is 2 or 3, then the period_type signals the duration of a scene over which the complexity metrics are applicable.

To provide an efficient representation for the four complexity metrics, the worst-case characteristics of each metric are analyzed and then the metric is normalized by the largest occurrence in the worst-case. The resulting fraction that lies in the [0,1] interval is packed into a byte.

Byte Representation for the Six-Tap Filterings Metric

Embodiments of this disclosure introduce the percentage of six-tap filterings having a size of a single byte, which allows an efficient representation. The percentage of six-tap filterings is defined as follows:

$$\text{percent\_six\_tap\_filterings} = \text{Floor}[(\text{num\_six\_tap\_filterings}/\text{max\_num\_six\_tap\_filterings})*255] \quad (1)$$

with max_num_six_tap_filterings defined as $$\text{max\_num\_six\_tap\_filterings} = \sum_{i=1}^{num\_pics\_per\_period} \text{max\_num\_six\_tap\_filterings\_pic}(i) \quad (2)$$

where: num_pics_per_period=the number of pictures in the specified period; and max_num_six_tap_filterings_pic(i) =the maximum number of six-tap filterings in the i-th picture within the specified period; and Floor(x) is the greatest integer less than or equal to x.

To determine max_num_six_tap_filterings_pic(i), denote the width and height of the reference picture luma array by PicWidthInSamples_L and refPicHeightEffectiveL respectively. At the decoder, in the worst-case, largest number of six-tap filterings (STFs) occurs in a picture when all partitions consist of 4×4 blocks that will be interpolated. The 4×4 blocks produce the largest number of STFs because the overhead from interpolating samples that are outside the block is larger for 4×4 blocks than for 8×8 blocks as explained below.

Figure 3:
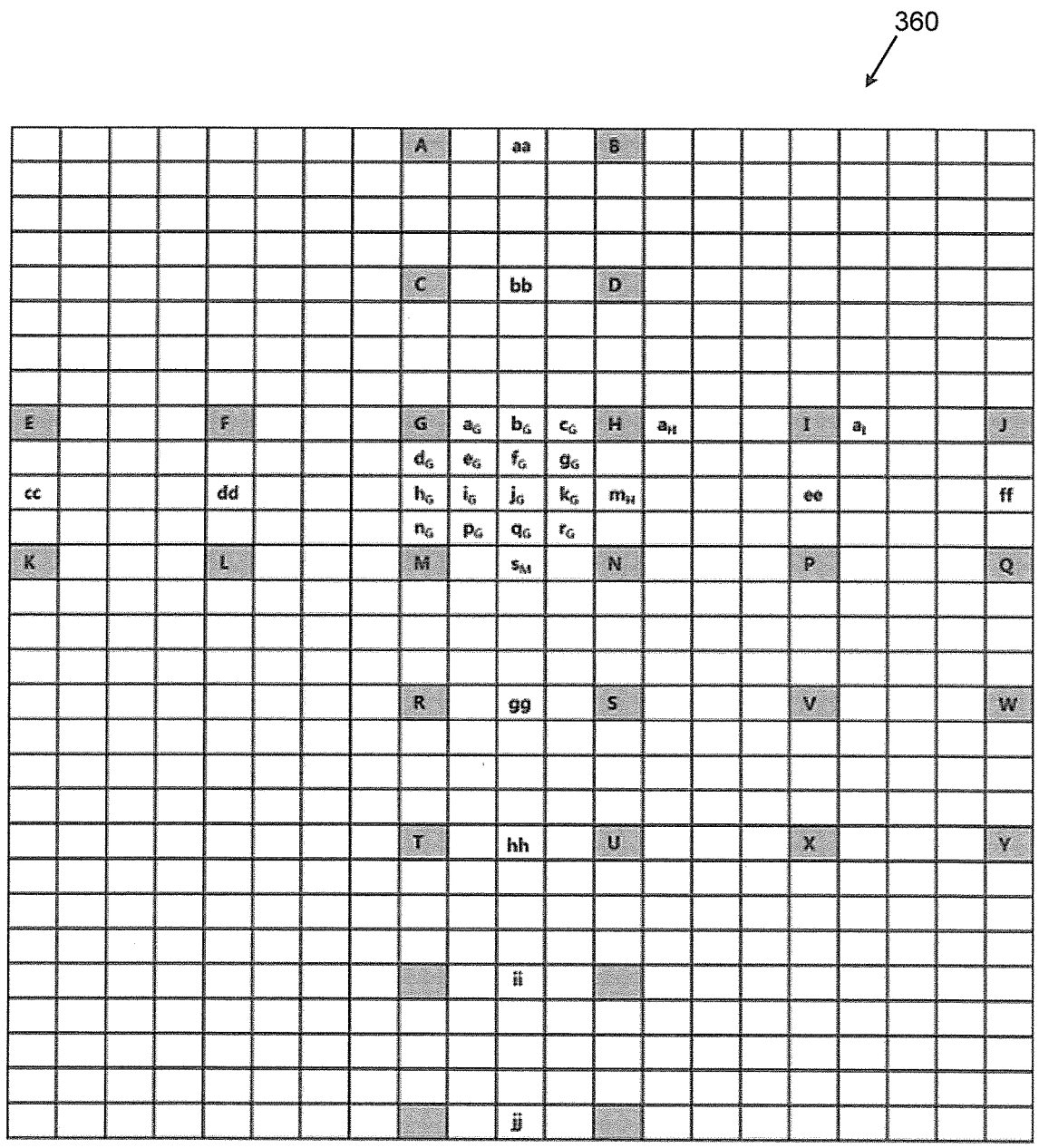
FIG. 3 illustrates the quarter-sample interpolation of the 4×4-block consisting of samples G, H, I, J, M, N, P, Q, R, S, V, W, T, U, X, Y according to this disclosure.

FIG. 3 illustrates the quarter-sample interpolation of the 4×4-block 360 consisting of samples G, H, I, J, M, N, P, Q, R, S, V, W, T, U, X, Y according to this disclosure. The embodiment of the quarter-sample interpolation of the 4×4-block 360 is for illustration only. Other embodiments could be used without departing from the scope of the present disclosure.

In FIG. 3, upper-case letters represent integer samples and lower-case letters represent fractional sample positions. Subscripts are used to indicate the integer sample that is associated with a fractional sample position. The worst-case largest number of STFs are analyzed for the interpolation of the 4×4-block consisting of samples G, H, I, J, M, N, P, Q, R, S, V, W, T, U, X, Y. This interpolation must be performed when a motion vector (MV) points to one of the following fractional-sample positions: $a_G$, $b_G$, $c_G$, $d_G$, $e_G$, $f_G$, $g_G$, $h_G$, $i_G$, $j_G$, $k_G$, $n_G$, $p_G$, $q_G$, $r_G$. If the MV points to $a_G$, then $a_G$ must be computed and the 15 points ($a_H$, $a_I$, . . . ) that have the same respective relative locations to H, I, J, M, N, P, Q, R, S, V, W, T, U, X, Y that $a_G$ has to G must be computed.

Similarly, sixteen points need to be computed for each of the other fractional-sample positions ($b_G$, $c_G$, . . . , $r_G$) that the MV could point to. To determine the worst-case largest number of STFs for the interpolation of the 4×4 block, the STFs required for each fractional-sample position that the MV could point to are counted.

Case 1. If the MV points to $b_G$, then to interpolate $b_G$, one STF is applied to E, F, G, H, I, J, which are already available as integer samples. So we need 16 STFs to compute $b_G$, . . . , $b_Y$ for the 4×4 block.

Case 2. If the MV points to $h_G$, then to interpolate $h_G$, one STF is applied to A, C, G, M, R, T, which are already available as integer samples. As such, sixteen STFs are needed to compute h_G, . . . , h_Y for the 4×4 block.

Case 3. If the MV points to $j_G$, then to interpolate $j_G$, six STFs are needed to compute aa, bb, $b_G$, $s_M$, gg, hh because these are unavailable. Next one STF is needed to compute $j_G$ from aa, bb, $b_G$, $s_M$, gg, hh. So we need 7 STFs for $j_G$:

a. To get $j_M$, the samples bb, $b_G$, $s_M$, gg, hh, ii are needed. Only ii is unavailable. As such, two STFs are needed for $j_M$ (one for ii and one for $j_M$);

b. To get $j_R$, two STFs are needed (one for jj and one for $j_R$); and c. To get $j_T$, two STFs are needed (one for kk and one for $j_T$);

Therefore, for $j_G$, $j_M$, $j_R$ and $j_T$, 7+2+2+2=13 STFs are needed. Since the computation is identical for each of the four columns GMRT, HNSU, IPVX and JQWY, 13*4=52 STFs are needed to compute $j_G$, . . . $j_Y$ for the 4×4 block.

Case 4. If the MV points to $a_G$, then to interpolate $a_G$, one STF is needed to get $b_G$ (from case 1) and therefore sixteen STFs are needed to compute $a_G$, . . . , $a_Y$ for the 4×4 block.

Case 5. If the MV points to $c_G$, then to interpolate $c_G$, one STF is needed to get $b_G$ (from Case 1) and therefore sixteen STFs are needed to compute $c_G$, . . . , $c_Y$ for the 4×4 block.

Case 6. If the MV points to $d_G$, then to interpolate $d_G$, one STF is needed to get $h_G$ (from Case 2) and therefore sixteen STFs are needed to compute $d_G$, . . . , $d_Y$ for the 4×4 block.

Case 7. If the MV points to $n_G$, then to interpolate $n_G$, one STF is needed to get $h_G$ (from Case 2) and therefore sixteen STFs are needed to compute $n_G$, . . . , $n_Y$ for the 4×4 block.

Case 8. If the MV points to $f_G$, then to interpolate $f_G$, seven STFs are needed to get $j_G$ (from Case 3). Note that $b_G$ is included in these 7 STFs. Therefore, from Case 3, 52 STFs are required to compute $f_G$, . . . $f_Y$ for the 4×4 block.

Case 9. If the MV points to $i_G$, then to interpolate $i_G$, seven STFs are needed to get $j_G$. Note that $h_G$ is computed by one of these seven STFs. Therefore, fifty-two STFs are required to compute $i_G$, . . . $i_Y$ for the 4×4 block. For this analysis, the row $j_G$, $j_H$, $j_I$, $j_J$ is computed first (in order to obtain $h_G$) and then this process is repeated for the other three rows (MNPQ, RSVW, TUXY) in the 4×4 block. Previously, in Case 3 Column GMRT was analyzed and then repeated for the other three columns (HNSU, IPVX, JQWY).

Case 10. If the MV points to $k_G$, then to interpolate $k_G$, seven STFs are needed to get $j_G$. Note that $m_G$ is computed by one of these seven STFs. Therefore, fifty-two STFs are required to compute $k_G$, . . . $k_Y$ for the 4×4 block.

Case 11. If the MV points to $q_G$, then to interpolate $q_G$, seven STFs are needed to get $j_G$. Note that $s_G$ is computed by one of these seven STFs. Therefore, fifty-two STFs are required to compute $q_G$, . . . $q_Y$ for the 4×4 block.

Case 12. If the MV points to $e_G$, then to interpolate $e_G$, two STFs are needed to get $b_G$ and $h_G$ (from Case 1, Case 2). Therefore thirty-two STFs are needed to compute $e_G$, . . . , $e_Y$ for the 4×4 block.

Case 13. If the MV points to $g_G$, then to interpolate $g_G$, two STFs are needed to get $b_G$ and $m_H$. Therefore, thirty-two STFs are needed to compute $g_G$, . . . , $g_Y$ for the 4×4 block.

Case 14. If the MV points to $p_G$, then to interpolate $p_G$, two STFs are needed to get $h_G$ and $s_G$. Therefore, thirty-two STFs are needed to compute $p_G$, . . . , $p_Y$ for the 4×4 block.

Case 15. If the MV points to $r_G$, then to interpolate $r_G$, two STFs are needed to get $m_G$ and $s_G$. Therefore, thirty-two STFs are needed to compute $r_G$, . . . , $r_Y$ for the 4×4 block.

From Cases 1 thorough 15, the worst-case largest number of STFs is fifty-two, when the MV points to $j_G$, $f_G$, $i_G$, $k_G$ or $q_G$. Since the overhead of filtering samples outside the block is smaller for larger block sizes, the worst case STFs is when all partitions are 4×4 blocks and two MVs are used for each block (one from each refPicList). A reference picture list (refpiclist) specifies the reference pictures, as defined in H.264 or ISO/IFC 14496 AVC specification, both of which are incorporated herein by reference.

In this case, the worst-case largest number of STFs in a picture is:

max_num_six_tap_filterings_pic(i)=(worst case
STFs in a 4×4 block)*(#refPicLists)*(#MBs in
the picture)*(#4×4 luma blocks per
MB)=52*2*PicSizeInMbs*16=1664*PicSizeInMbs     (3)

The preceding analysis assumes that a processing unit performs a single six-tap filtering. However, in certain embodiments in which a processing unit performs N six-tap filtering operations simultaneously, where N>1, then the worst-case largest number of STFs in a picture is of the order of 1664/N. In such embodiments, num_six_tap_filterings is also reduced by a factor of N.

The preceding analysis also assumes an efficient implementation in which filtering is not repeated. For example in Case 3a, the samples bb, $b_G$, $s_M$, gg, hh are not re-computed but are re-used from a prior filtering operation. In other embodiments, filterings may be repeated because it is simpler to re-filter rather than to access a stored value. In such embodiments, the worst-case largest number of STFs in a picture is of the order of 1664α, where α>1. In such embodiments, num_six_tap_filterings is also increased by a factor of α.

Byte Representation for the Alpha-Point Deblocking Instances Metric

Embodiments of this disclosure introduce the percentage of alpha-point deblocking instances that allows an efficient representation. In one embodiment, in order to satisfy a size of a single byte, the percentage of alpha-point deblocking instances is defined as follows:

percent_alpha_point_deblocking_instances=Floor
[(num_alpha_point_deblocking_instances/max_
num_alpha_point_deblocking_instances)*255]        (4)

with max_num_alpha_point_deblocking_instances defined as $$\Sigma_{i=1}^{num\_pics\_per\_period} max\_num\_alpha\_point\_deblocking\_instances\_pic(i) \quad (5)$$

where: num_pics_per_period=the number of pictures in the specified period; and max_num_alpha_point_deblocking_instances_pic(i)=the maximum number of alpha-point deblocking instances in the $i^{th}$ picture within the specified period.

To determine max_num_alpha_point_deblocking_instances_pic(i), the worst-case, largest number of Alpha-Point Deblocking Instances (APDIs) that can occur when deblocking the picture at the decoder must be determined.

Figure 4:
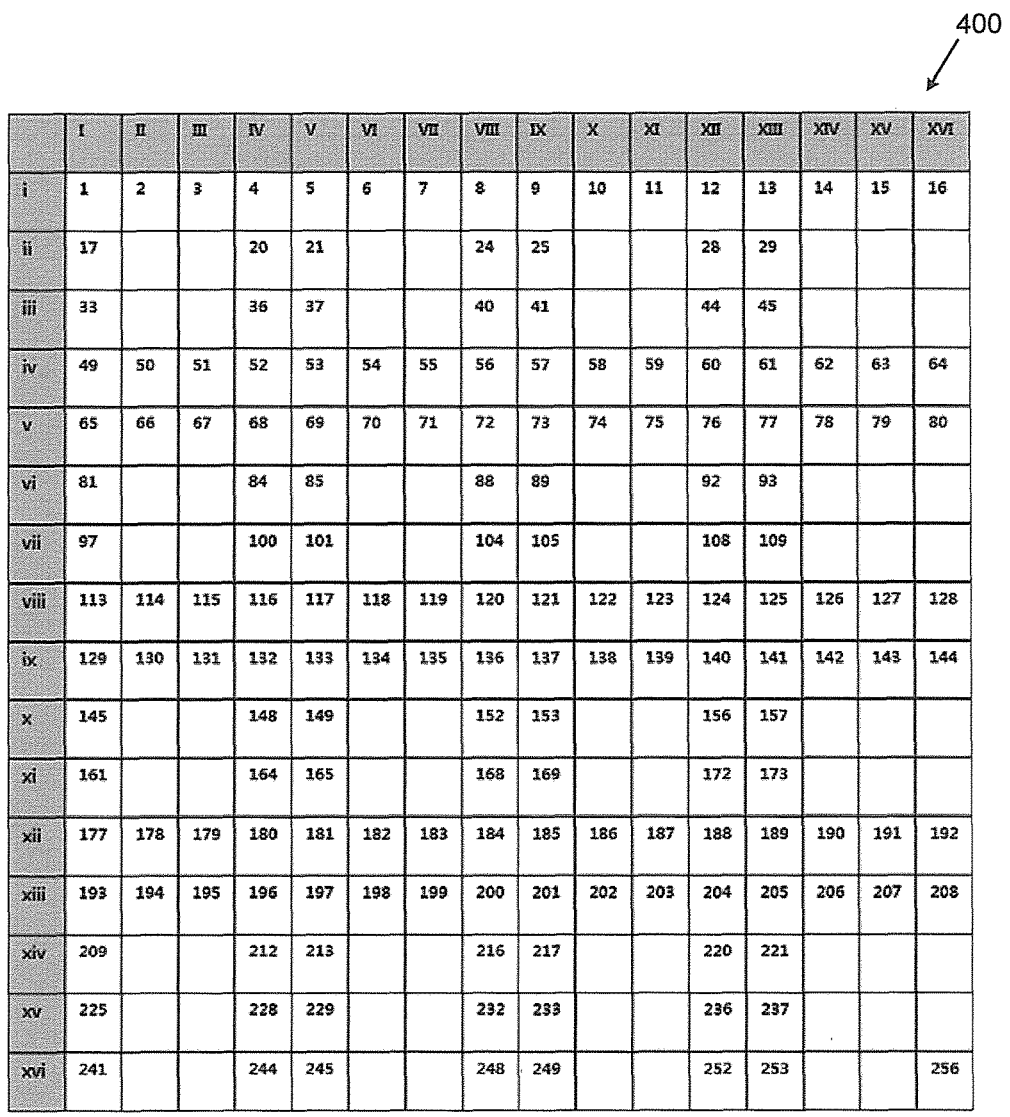
FIG. 4 illustrates a 16×16 luma block, in which upper-case roman numerals reference columns of samples and lower-case roman numerals reference rows of samples according to this disclosure.

Let's consider a macroblock containing a 16×16 luma block in which the samples have been numbered in raster-scan order, as shown in FIG. 4. Upper-case roman numerals are used to reference columns of samples and lower-case roman numerals are used to reference rows of samples. For example, Column IV refers to the column of Samples 4, 20, . . . 244 and Row xiii refers to the row of samples 193, 194, . . . , 208. Edges are indicated by an ordered pair that specifies the columns or rows on either side of the edge. For example, Edge (IV, V) refers to the vertical edge between Columns IV and V. Similarly, Edge (xii, xiii) indicates the horizontal edge between Rows xii and xiii. Note that the leftmost vertical edge and the topmost horizontal edge are denoted by (0, I) and (0, i) respectively.

The maximum number of APDIs occurs when the 4×4 transform is used on each block and a single APDI occurs in every set of eight samples across a 4×4 block horizontal or vertical edge denoted as $p_i$ and $q_i$ with i=0, . . . , 3 (as shown in FIG. 8-11 of the ITU-T H.264 or ISO/IEC 14496-10 International Standard, MPEG-4 AVC spec).

FIG. 4 illustrates a 16×16 luma block 400, in which upper-case roman numerals reference columns of samples and lower-case roman numerals reference rows of samples according to this disclosure. The embodiment of the 16×16 luma block 400 shown in FIG. 4 is for illustration only. Other embodiments could be used without departing from the scope of the present disclosure.

For the macroblock in FIG. 4, the Vertical Edges (0, I), (IV, V), (VIII, IX) and (XII, XIII) are filtered first. Then, the Horizontal Edges (0, i), (iv, v), (viii, ix) and (xii, xiii) are filtered. Now, when Vertical Edge (0, I) is filtered, in the worst-case, an APDI will occur on each row of the edge because the $q_0$ Samples 1, 17, . . . 241 will all be APDIs. Therefore, 16 APDIs will occur in Vertical Edge (0, I). Similarly, when Vertical Edge (IV, V) is filtered, there will also be 16 APDIs corresponding to the 16 ($p_0$, $q_0$) sample pairs (20, 21), (36, 37), . . . (244, 245). Thus, there will be 16*4=64 APDIs from vertical-edge filtering. After horizontal-edge filtering, there will be an additional 64 APDIs because each horizontal edge will contribute 16 APDIs. For example, Horizontal Edge (viii, ix) will contribute the 16 APDIs corresponding to the ($p_0$, $q_0$) sample pairs (113, 129), (114, 130), . . . , (128, 144). Hence, in the worst-case, deblocking the luma block in a macroblock produces 128 APDIs.

Next, the two chroma blocks corresponding to the luma block in the macroblock are considered. The worst-case number of APDIs is determined by the chroma sampling relative to the luma sampling.

For each chroma block in YUV 4:2:0 format, two vertical edges and two horizontal edges are filtered. Each edge contributes 8 APDIs, in the worst-case. So, 8*4*2=64 APDIs are produced by worst-case deblocking of the two chroma blocks.

For YUV 4:2:2 format, two vertical edges and four horizontal edges are filtered. Each vertical edge contributes 16 APDIs and each horizontal edge contributes 8 APDIs. So, 2*(2*16+4*8)=128 APDIs are produced by worst-case deblocking of the two chroma blocks.

For YUV 4:4:4 format, the worst-case analysis for each chroma block is identical to that of the 16×16 luma block. Therefore, 256 APDIs are produced by worst-case deblocking of the two chroma blocks.

Finally, for separate color planes, the worst-case analysis of a 16×16 block is identical to that a 16×16 luma block.

To conclude, since each picture has PicSizeInMbs macroblocks, the worst-case (maximum) number of APDIs per picture is as follows:

$$\begin{aligned}
\text{max\_num\_alpha\_point\_deblocking\_instances\_pic}(i) &= PicSizeInMbs*(128+64)/N = 192/N* \\
&\quad PicSizeInMbs, \text{ for } YUV\ 4{:}2{:}0 \text{ format}; \\
&= PicSizeInMbs*(128+128)/N = 256* \\
&\quad PicSizeInMbs, \text{ for } YUV\ 4{:}2{:}2 \text{ format}; \\
&= PicSizeInMbs*(128+256)/N = 384* \\
&\quad PicSizeInMbs, \text{ for } YUV\ 4{:}4{:}4 \text{ format}; \text{ or} \\
&= 128*PicSizeInMbs, \\
&\quad \text{for a single color plane}.
\end{aligned}$$

Equivalently, max_num_alpha_point_deblocking_instances_pic(i)=
128*chroma_format_multiplier*PicSizeInMbs where chroma_format_multiplier depends on the AVC variables separate_colour_plane_flag and chroma_format_idc as shown in the following table.

| chroma_format_multiplier | separate_colour_plane_flag | chroma_format_idc | Comment |
|---|---|---|---|
| 1 | 1 | any value | separate colour plane |
| 1 | 0 | 0 | monochrome |

-continued

| chroma_format_multiplier | separate_colour_plane_flag | chroma_format_idc | Comment |
|---|---|---|---|
| 1.5 | 0 | 1 | 4:2:0 sampling |
| 2 | 0 | 2 | 4:2:2 sampling |
| 3 | 0 | 3 | 4:4:4 sampling |

The preceding analysis assumes that a processing unit performs a single APDI. However, in certain embodiments in which a processing unit performs N APDIs simultaneously, where N>1, then the worst-case largest number of APDIs in a picture is reduced by a factor of N:

$$\text{max\_num\_alpha\_point\_deblocking\_instances\_pic}(i) = PicSizeInMbs*(128+64)/N = 192/N * PicSizeInMbs, \text{ for } YUV\ 4:2:0 \text{ format};$$
$$= PicSizeInMbs*(128+128)/N = 256/N * PicSizeInMbs, \text{ for } YUV\ 4:2:2 \text{ format};$$
$$= PicSizeInMbs*(128+256)/N = 384/N * PicSizeInMbs, \text{ for } YUV\ 4:4:4 \text{ format};$$
$$= 128/N * PicSizeInMbs,$$

for a single color plane.

In such embodiments, num_alpha_point_deblocking_instances is also reduced by a factor of N.

Byte Representation for the Non-Zero Macroblocks Metric

Embodiments of this disclosure introduce the percentage of non-zero macroblocks that allows an efficient representation. In one embodiment, in order to satisfy a size of a single byte, the percentage of non-zero macroblocks is defined as follows:

percent_non_zero_macroblocks=(num_non_zero_macroblocks/max_num_non_zero_macroblocks)*255 (7)

with max_num_non_zero_macroblocks defined as $$\Sigma_{i=1}^{num\_pics\_per\_period} \text{max\_num\_non\_zero\_macroblocks\_pic}(i) \quad (8)$$

where: num_pics_per_period=the number of pictures in the specified period; and max_num_non_zero_macroblocks_pic(i)=picSizeInMBs for the $i^{th}$ picture within the specified period.

Byte Representation for the Intra-Coded Macroblocks Metric

Embodiments of this disclosure introduce the percentage of intra-coded macroblocks that allows an efficient representation. In one embodiment, in order to satisfy a size of a single byte, the percentage of intra-coded macroblocks is defined as follows:

percent_intra_coded_macroblocks=(num_intra_coded_macroblocks/max_num_intra_coded_macroblocks)*255 (9)

with max_num_intra_coded_macroblocks defined as:

$$\Sigma_{i=1}^{num\_pics\_per\_period} \text{max\_num\_intra\_coded\_macroblocks\_pic}(i) \quad (10)$$

where: num_pics_per_period=the number of pictures in the specified period; and max_num_intra_code_macroblocks_pic(i)=picSizeInMBs for the $i^{th}$ picture within the specified period.

In an alternative embodiment, the logarithm (to base 2, or any other base) of the percentage metric can be used to emphasize the lower range of the metric.

The techniques disclosed in this patent document allow products, such as smartphones and tablets, to be much more power efficient while reducing the data costs, thus improving the user experience for mobile streaming applications.

While each process flow and/or signal sequence depicted in the figures and described above depicts a sequence of steps and/or signals, either in series or in tandem, unless explicitly stated or otherwise self-evident (such as that a signal cannot be received before being transmitted) no inference should be drawn from that sequence regarding specific order of performance, performance of steps or portions or transmission of signals thereof serially rather than concurrently or in an overlapping manner, or performance the steps or transmission of signals depicted exclusively without the occurrence of intervening or intermediate steps or signals. Moreover, those skilled in the art will recognize that complete processes and signal sequences are not illustrated or described. Instead, for simplicity and clarity, only so much of the respective processes and signal sequences as is unique to this disclosure or necessary for an understanding of this disclosure is depicted and described.

Although this disclosure has been described with exemplary embodiments, various changes and modifications can be suggested to one skilled in the art. It is intended that this disclosure encompass such changes and modifications as fall within the scope of the appended claims.

What is claimed is:

1. A decoder for video processing comprising:
   a receiver configured to receive, from a encoder, a bitstream associated with a video;
   a processor configured to:
   parse the bitstream to determine a percentage of at least one of a number of six tap filterings or a number of alpha point deblocking instances, in a specified period;
   determine a voltage and frequency to be used for decoding the video as a function
   of the percentage of the at least one of the number of six tap filterings or the number of alpha point deblocking instances, in the specified period; and
   operate the decoder at the determined voltage and frequency to decode the video, wherein the percentage of six tap filtering, denoted as percent_six_tap_filterings, in the specified period is determined using:

(num six tap filterings/max num six tap filterings)*255 wherein the max num six tap filterings is defined as:

$$\text{max num six tap filterings} = \Sigma_{i=1}^{num\_pics\_per\_period} \text{max num six tap filterings pic}(i)$$

where:
   the num pics per period=a number of pictures in the specified period; and the max num six tap filterings pic(i)=a maximum number of six-tap filterings in an ith picture within the specified period.

2. The decoder according to claim 1 wherein the maximum number of STFs, noted as max_num_six_tap_filterings_pic(i), is determined according to:

$$\text{the max\_num\_six\_tap\_filterings\_pic}(i) = 1664 * \text{PicSizeInMbs},$$

where the PicSizeInMbs is picture size in a macroblock.

3. The decoder according to claim 1 wherein the maximum number of STFs, noted as max_num_six_tap_filterings_pic(i), is determined according to:

$$\text{the max\_num\_six\_tap\_filterings\_pic}(i) = 1664 * x * \text{PicSizeInMbs},$$

where the PicSizeInMbs is picture size in a macroblock, and x=1/N, where N is the number of STFs performed by a single processing unit (with N>1), or x=α, where α>1 is a factor that accounts for repeated filterings.

4. The decoder according to claim 1, wherein the percentage of alpha point deblocking instances, noted as percent_alpha_point_deblocking_instances, in the specified period is determined using:

$$(\text{num\_alpha\_point\_deblocking\_instances} / \text{max\_num\_alpha\_point\_deblocking\_instances}) * 255,$$

with the max_num_alpha_point_deblocking_instances defined as:

$$\sum_{i=1}^{num\_pics\_per\_period} \text{max\_num\_alpha\_point\_deblocking\_instances\_pic}(i)$$

where:
the num_pics_per_period=a number of pictures in the specified period; and
the max_num_alpha_point_deblocking_instances_pic(i)=a maximum number of alpha-point deblocking instances in the $i^{th}$ picture within the specified period.

5. The decoder according to claim 4, wherein the max_num_alpha_point_deblocking_instances_pic(i) is determined by either:
192*PicSizeInMbs, for YUV 4:2:0 format;
256*PicSizeInMbs, for YUV 4:2:2 format;
384*PicSizeInMbs, for YUV 4:4:4 format; or
128*PicSizeInMbs, for a single color plane, where the PicSizeInMbs is a number of macroblocks in a picture.

6. The decoder according to claim 4, wherein the max_num_alpha_point_deblocking_instances_pic(i) is determined by either:
192/N*PicSizeInMbs, for YUV 4:2:0 format;
256/N*PicSizeInMbs, for YUV 4:2:2 format;
384/N*PicSizeInMbs, for YUV 4:4:4 format or
128/N*PicSizeInMbs, for a single color plane,
where N is a number of STFs performed by a single processing unit and N>1.

7. An encoder for video processing, the encoder comprising:
a transmitter configured to transmit a bitstream associated with a video to a decoder;
and a processor configured to:
encode a video to include at least one variable of a number of six tap filterings or a number of alpha point deblocking instances;
determine a percentage of the at least one of the number of six tap filterings or the number of alpha point deblocking instances; and generate the bitstream containing the percentage of the at least one of the number of six tap filterings or the number of alpha point deblocking instances,
wherein the percentage of six tap filtering, noted as percent_six_tap_filterings, in the specified period is determined using:

$$(\text{num six tap filterings} / \text{max num six tap filterings}) * 255$$

with the max num six tap filterings defined as:

$$\text{max num six tap filterings} = \sum_{i=1}^{num\_pics\_per\_period} \text{max num six tap filterings pic}(i)$$

where:
the num pics per period=a number of pictures in the specified period; and
the max num six tap filterings pic(i)=a maximum number of six-tap filterings in an i-th picture within the specified period.

8. The encoder according to claim 7, wherein the maximum number of STFs, noted as max_num_six_tap_filterings_pic(i), is determined according to:

$$\text{the max\_num\_six\_tap\_filterings\_pic}(i) = 1664 * x * \text{PicSizeInMbs},$$

where the PicSizeInMbs is picture size in a macroblock, and x=1/N, where N is the number of STFs performed by a single processing unit (with N>1), or x=α, where α>1 is a factor that accounts for repeated filterings.

9. The encoder according to claim 7, wherein the percentage of alpha point deblocking instances, noted as percent_alpha_point_deblocking_instances, in the specified period is determined using:

$$(\text{num\_alpha\_point\_deblocking\_instances} / \text{max\_num\_alpha\_point\_deblocking\_instances}) * 255,$$

with the max_num_alpha_point_deblocking_instances defined as:

$$\sum_{i=1}^{num\_pics\_per\_period} \text{max\_num\_alpha\_point\_deblocking\_instances\_pic}(i)$$

where:
the num_pics_per_period=a number of pictures in the specified period; and
the max_num_alpha_point_deblocking_instances_pic(i)=a maximum number of alpha-point deblocking instances in the $i^{th}$ picture within the specified period.

10. The encoder according to claim 9, wherein the max_num_alpha_point_deblocking_instances_pic(i) is determined by either:
192/N*PicSizeInMbs, for YUV 4:2:0 format;
256/N*PicSizeInMbs, for YUV 4:2:2 format;
384/N*PicSizeInMbs, for YUV 4:4:4 format; or
128/N*PicSizeInMbs, for a single color plane, where N is a number of STFs performed by a single processing unit and N>1.

11. A method for video processing, the method comprising:
parsing, at a decoder, a bitstream associated with a video to determine a percentage of at least one of a number of six tap filterings or a number of alpha point deblocking instances, in a specified period;
determining, at the decoder, a voltage and frequency to be used for decoding the video proportional to the percentage of the at least one of the number of six tap filterings or the number of alpha point deblocking instances, in the specified period; and operating the decoder at the determined voltage and frequency to decode the video, wherein the percentage of six tap filtering, noted as percent six tap filterings, in the specified period is determined using:

num six tap filterings/max num six tap filterings)*255 wherein the max num six tap filterings is defined as:

max num six tap filterings=$\Sigma_{j=1}^{num\_pics\_per\_period}$ max num six tap filterings pic($i$)

where:
num pics per period=a number of pictures in the specified period; and
max num six tap filterings pic(i)=a maximum number of six-tap filterings in an i-th picture within the specified period.

12. The method according to claim 11, wherein the percentage of either the number of six tap filterings, the number of alpha point deblocking instances, the number of non-zero macroblocks, or the number of intra-coded macroblocks, is of a size of one byte.

13. The method according to claim 11 wherein the maximum number of STFs, noted as max_num_six_tap_filterings_pic(i), in a picture is determined according to:

the max_num_six_tap_filterings_pic($i$)=1664*PicSizeInMbs, where the PicSizeInMbs is a number of macroblocks in a picture.

14. The method according to claim 11, wherein the maximum number of STFs, noted as max_num_six_tap_filterings_pic(i), is determined according to:

the max_num_six_tap_filterings_pic($i$)= 1664*$x$*PicSizeInMbs, where the PicSizeInMbs is picture size in a macroblock, and x=1/N, where N is the number of STFs performed by a single processing unit (with N>1), or x=α, where α>1 is a factor that accounts for repeated filterings.

15. The method according to claim 11, wherein the percentage of alpha point deblocking instances, noted as percent_alpha_point_deblocking_instances, in the specified period is determined using:

(num_alpha_point_deblocking_instances/max_num_alpha_point_deblocking_instances)*255, with the max_num_alpha_point_deblocking_instances defined as:

$\Sigma_{i=1}^{num\_pics\_per\_period}$ max_num_alpha_point_deblocking_instances_pic($i$)

where:
the num_pics_per_period=a number of pictures in the specified period; and
the max_num_alpha_point_deblocking_instances_pic(i)=a maximum number of alpha-point deblocking instances in the $i^{th}$ picture within the specified period.

16. The method according to claim 15, wherein
the max_num_alpha_point_deblocking_instances_pic(i) is determined by either:
192*PicSizeInMbs, for YUV 4:2:0 format;
256*PicSizeInMbs, for YUV 4:2:2 format;
384*PicSizeInMbs, for YUV 4:4:4 format; or
128*PicSizeInMbs, for a single color plane, where the PicSizeInMbs is a number of macroblocks in a picture.

17. The method according to claim 15, wherein the max_num_alpha_point_deblocking_instances_pic(i) is determined by either:
192/N*PicSizeInMbs, for YUV 4:2:0 format;
256/N*PicSizeInMbs, for YUV 4:2:2 format;
384/N*PicSizeInMbs, for YUV 4:4:4 format; or
128/N*PicSizeInMbs, for a single color plane, where N is the number of STFs performed by a single processing unit and N>1.

* * * * *